(12) United States Patent
You

(10) Patent No.: US 8,863,229 B2
(45) Date of Patent: Oct. 14, 2014

(54) METHOD AND SYSTEM FOR RESOURCE AND ADMISSION CONTROL OF HOME NETWORK

(75) Inventor: Jianjie You, Shenzhen (CN)

(73) Assignee: ZTE Corporation, Shenzhen (CN)

(*) Notice: Subject to any disclaimer, the term of this patent is extended or adjusted under 35 U.S.C. 154(b) by 44 days.

(21) Appl. No.: 13/637,867

(22) PCT Filed: Jun. 11, 2010

(86) PCT No.: PCT/CN2010/073822
§ 371 (c)(1),
(2), (4) Date: Oct. 11, 2012

(87) PCT Pub. No.: WO2011/120257
PCT Pub. Date: Oct. 6, 2011

(65) Prior Publication Data
US 2013/0160073 A1    Jun. 20, 2013

(30) Foreign Application Priority Data

Apr. 2, 2010   (CN) .......................... 2010 1 0142052

(51) Int. Cl.
*G06F 17/00* (2006.01)
*H04L 29/06* (2006.01)
*H04W 28/18* (2009.01)

(52) U.S. Cl.
CPC .............. *H04L 63/20* (2013.01); *H04W 28/18* (2013.01)
USPC ................. 726/1; 709/223; 713/172; 726/15; 726/27; 370/329; 370/352; 370/401

(58) Field of Classification Search
CPC  H04L 63/0227; H04L 63/1416; H04W 12/08
USPC .................... 726/21–23, 1–12; 709/229–230; 370/230, 352–401
See application file for complete search history.

(56) References Cited

U.S. PATENT DOCUMENTS 8,108,677 B2 * 1/2012 Anderson et al. ............. 713/172
8,249,236 B2 * 8/2012 Das et al. ................. 379/202.01

(Continued)

FOREIGN PATENT DOCUMENTS

| CN | 101252586 A | 8/2008 |
| CN | 101309227 A | 11/2008 |
| CN | 101330469 A | 12/2008 |

OTHER PUBLICATIONS

Yangjung Kim, Resource Control Mechanism on NGN based Home Network, Feb. 2010, IEEE, pp. 300-304.*

(Continued)

*Primary Examiner* — Cordelia Zecher
*Assistant Examiner* — Viral Lakhia
(74) *Attorney, Agent, or Firm* — Oppedahl Patent Law Firm LLC

(57) ABSTRACT

The disclosure provides a method for resource and admission control of a home network, the RACF of an NGN retail service provider formulates an initial policy rule according to a resource request after receiving the resource request sent by an SCF; a CPN performs authorization check on one or more resource requests after receiving them, each of which includes the initial policy rule and is sent by an RACF of a respective NGN retail service provider, formulates a final policy rule after the authorization check is passed, and executes the final policy rule. The disclosure further provides a system for resource and admission control of a home network correspondingly, since a CGPE-FE executes corresponding operation according to the decision result of an HPD-FE, the disclosure can avoid resource control errors such as resource desynchrony or resource inconsistence, and can improve system stability.

16 Claims, 4 Drawing Sheets

(56) References Cited

U.S. PATENT DOCUMENTS

| | | | |
|---|---|---|---|
| 8,300,631 B2* | 10/2012 | Dai | 370/352 |
| 8,582,515 B2* | 11/2013 | Schuringa et al. | 370/329 |
| 8,611,359 B1* | 12/2013 | Kompella et al. | 370/401 |
| 2007/0162559 A1* | 7/2007 | Biswas et al. | 709/216 |
| 2008/0092228 A1* | 4/2008 | Baum | 726/13 |
| 2008/0144615 A1* | 6/2008 | Casey | 370/389 |
| 2008/0162637 A1* | 7/2008 | Adamczyk et al. | 709/204 |
| 2009/0006116 A1 | 1/2009 | Baker | |
| 2009/0029645 A1* | 1/2009 | Leroudier | 455/7 |
| 2009/0144807 A1* | 6/2009 | Zheng | 726/3 |
| 2009/0147792 A1* | 6/2009 | Anschutz et al. | 370/395.21 |
| 2009/0150506 A1* | 6/2009 | Wang et al. | 709/206 |
| 2009/0219946 A1* | 9/2009 | Liu et al. | 370/437 |
| 2010/0271943 A1* | 10/2010 | Wu et al. | 370/230 |
| 2011/0261690 A1* | 10/2011 | Song et al. | 370/230 |

OTHER PUBLICATIONS

International Search Report in international application No. PCT/CN2010/073822, mailed on Jan. 6, 2011.

English Translation of the Written Opinion of the International Search Authority in international application No. PCT/CN2010/073822, mailed on Jan. 6, 2011.

* cited by examiner

METHOD AND SYSTEM FOR RESOURCE AND ADMISSION CONTROL OF HOME NETWORK

TECHNICAL FIELD

The disclosure relates to the technology of resource and admission control, and in particular to a method and a system for resource and admission control of a home network.

BACKGROUND

The Next Generation Network (NGN) is currently a hot research topic in the field of communication standard, which adopts the IP packet technology as a bearer network technology, and integrates fixed communication and mobile communication so as to provide more multimedia services, such as emerging services with real-time requirements like IPTV, Video conference, multimedia distance learning, video on demand, and so on. These services require that a communication network should provide efficient end-to-end Quality of Service (QoS) support, therefore, providing end-to-end QoS has become one of the core issues of the NGN.

The International Telecommunication Union-Telecommunications standardization sector (ITU-T) is a telecom sector of the International Telecommunication Union (ITU), which formulated the standard related to resource and admission control. In a latest Resource and Admission Control Function (RACF) draft released by the ITU-T, the functional framework of the RACF is provided, as shown in FIG. 1, the RACF is consisted of two parts, i.e. Policy Decision Functional Entity (PD-FE) and Transport Resource Control Functional Entity (TRC-FE).

The PD-FE makes preliminary QoS resource decision based on media stream session information (obtained from a Service Control Function (SCF) through Rs interface) and transmission resource subscription information (obtained from a Network Attachment Control Function (NACF) through Ru interface), then interacts with the TRC-FE to confirm whether there are enough QoS resources, after which makes a final admission decision and transmits the decision to a PE-FE to execute. In other words, the PD-FE relates neither to the transmission technology nor to the SCF, the PD-FE makes the final decision of resource and admission control based on Network policy rules, the service information provided by the SCF, the transport layer subscription information provided by the NACF, and the resource availability decision result provided by the TRC-FE.

The TRC-FE is not related to services but related to the transmission technology. The TRC-FE is responsible for collecting and maintaining transmission network information and resource status information. After receiving a resource request from the PD-FE, the TRC-FE executes resource-based admission control according to the QoS, priority needs, resource availability information and policy rules related to transmission.

Besides, the transport layer in the home network is generally consisted of a Policy Enforcement Functional Entity (PE-FE) and a Transport Resource Enforcement Functional Entity (TRE-FE), wherein the PE-FE is a packet-to-packet gateway, and may be located between a Customer Premises Network (CPN) and an access network, between an access network and a core network, or between different operator's networks. The PE-FE is a key node supporting dynamic QoS control, port address translation control and Network Address Translator (NAT) traversing, and mainly for executing policy control (Gating, bandwidth, traffic classification and marking, traffic shaping, two-layer and three-layer QoS mapping, collecting and reporting resource usage situation and the like) under the guidance of the PD-FE. The TRE-FE executes the transport resource policy rules transmitted by the TRC-FE. The range and function of the TRE-FE as well as the Rn interface need further study, which are not within the study scope of stage R2.

The Customer Premises Network (CPN) includes a Home network Policy Decision Functional Entity (HPD-FE), which executes policy decision in the range of the home network; the CPN further includes a CPN Gateway Policy Enforcement Functional Entity (CGPE-FE), which executes policy rules transmitted by the HPD-FE or PD-FE.

Now, the demands of users for home security and entertainment services, such as video surveillance, network gaming, P2P transmission and IPTV and the like, are increasingly strong. To effectively support this kind of services with high speed, high service requirements and high security, an operator needs to perform QoS control on the home network. A home gateway is the essential core component of the home network, which connects the network devices of home with external network, and is a physical interface interconnects a home internal network with all external networks.

In a non-nomadic/non-roaming scene, the PD-FE of a RACF controls the CGPE-FE of a CPN through the Rh interface or controls a HPD-FE through the Rh' interface, so as to control the home network.

FIG. 2 shows a schematic diagram of the resource and admission control of a home network under the wholesale scene in the related art. as shown in FIG. 2, in the wholesale scene, an NGN wholesale service provider takes the network level as an infrastructure and opens to many NGN retail service providers in the mode of wholesale and provides no service, while the NGN retail service provider provides various services. When a user is in the wholesale scene, the user may use the network access of the NGN wholesale service provider to access the network and enjoy the services provided by the NGN retail service provider.

However, in the wholesale scene shown in FIG. 2, the SCF belongs to the NGN retail service provider, and the PD-FE of the NGN retail service provider interacts with a CGPE-FE of a CPN through the Rh interface, so as to realize the resource and admission control on the home network. Because the CGPE-FE only has a policy enforcement function without a policy decision function, the CGPE-FE, after receiving policy rules from the PD-FE of the NGN retail service provider, installs policy rules directly without performing authorization check and policy control. In this case, if a malicious request is received, the CGPE-FE will execute a malicious policy. Moreover, since many NGN retail service providers may share a certain home gateway, therefore, in the case that the RACFs of different NGN retail service providers control the CGPE-FE simultaneously, resource control errors such as resource desynchrony or resource inconsistence and the like may occur, which is not conducive to the stability of a system.

SUMMARY

In view of the above, the main purpose of the disclosure is to provide a method and a system for resource and admission control of a home network, which can realize resource and admission control of home network in the wholesale scene, and can improve the stability of a system.

To achieve the above purpose, the technical solution of the disclosure is realized as follows.

A method for resource and admission control of a home network includes:

a Resource and Admission Control Function (RACF) of a Next Generation Network (NGN) retail service provider performs authorization check on a received resource request after receiving the resource request sent by a Service Control Function (SCF), formulates an initial policy rule after the authorization check is passed, and sends a resource request including the initial policy rule to a Customer Premises Network (CPN);

the CPN performs authorization check on one or more resource requests after receiving them, each of which includes the initial policy rule and is sent by an RACF of a respective NGN retail service provider, formulates a final policy rule after the authorization check is passed, and executes the final policy rule.

The operation that the RACF of the NGN retail service provider sends the resource request including the initial policy rule to the CPN may be: a Policy Decision Functional Entity of the RACF of the NGN retail service provider (PD-FE(R)) sends the resource request including the initial policy rule to a Home network Policy Decision Functional Entity (HPD-FE) of the CPN, the operation that the CPN performs the authorization check on the resource requests, formulates the final policy rule after the authorization check is passed, and executes the final policy rule may be:

the HPD-FE of the CPN performs the authorization check on the resource requests, and formulates the final policy rule after the authorization check is passed;

the HPD-FE sends the resource request including the final policy rule to a CPN Gateway Policy Enforcement Functional Entity (CGPF-FE); and the CGPE-FE executes the final policy rule sent by the HPD-FE according to the received resource request.

The method may further include: after the CGPE-FE executes the final policy rule, the CGPE-FE sends a corresponding resource response to the HPD-FE;

the HPD-FE sends a corresponding resource response to the PD-FE(R); and the PD-FE(R) sends a corresponding resource response to the SCF.

The resource request may be a resource initialization request or a resource modification request.

The resource initialization request sent by the SCF to the PD-FE(R) may include at least one of media stream description and Quality of Service (QoS) parameters; the resource modification request may include at least one of media stream description and QoS parameters needing to be modified.

The resource request sent by the PD-FE(R) to the HPD-FE may include at least a PD-FE(R) identifier and the initial policy rule.

The operation that the HPD-FE performs the authorization check on the resource request may be: checking whether QoS resources related to the resource request is consistent with a local operator policy rule.

The HPD-FE may formulate the final policy rule according to one or any combination of the following elements: resource availability of the home network, service level agreement, and the initial policy rule.

A method for resource and admission control of a home network includes:

an SCF sends a resource release request to a PD-FE(R) according to a release request from a user;

the PD-FE(R) sends a resource release request to an HPD-FE;

the HPD-FE sends a resource release request to a CGPE-FE;

the CGPE-FE sends a resource release response to the HPD-FE after releasing corresponding resources according to the resource release request from the HPD-FE;

the HPD-FE sends a resource release response to the PD-FE(R); and the PD-FE(R) sends a resource release response to the SCF.

The resource release request sent by the SCF to the PD-FE(R) may include information on QoS resources needing to be released.

A system for resource and admission control of a home network includes: an SCF, one or more RACFs each belonging to a respective NGN retail service provider, and a CPN; wherein the SCF is configured to send a resource request to an RACF of an NGN retail service provider according to a request from a user;

the RACF of the NGN retail service provider is configured to perform authorization check on the resource request from the SCF, formulate an initial policy rule after the authorization check is passed, and send a resource request including the initial policy rule to the CPN;

the CPN is configured to perform authorization check on one or more resource request after receiving them, each of which is from an RACF of a respective NGN retail service provider, formulate a final policy rule after the authorization check is passed, and execute the final policy rule.

The RACF of the NGN retail service provider may include a Policy Decision Functional Entity PD-FE(R), the CPN may include an HPD-FE and a CGPF-FE, wherein the PD-FE(R) may be configured to perform authorization check on the received resource request, formulate an initial policy rule after the authorization check is passed, and send a resource request including the initial policy rule to the HPD-FE;

the HPD-FE may be configured to perform authorization check on the resource request from the PD-FE(R), formulate the final policy rule after the authorization check is passed, and send a resource request including the final policy rule to the CGPF-FE;

the CGPE-FE may be configured to execute the final policy rule sent by the HPD-FE according to the received resource request.

The CGPE-FE may be further configured to send a corresponding resource response to the HPD-FE after executing the final policy rule;

the HPD-FE may be further configured to send a corresponding resource response to the PD-FE(R) after receiving the resource response from the CGPE-FE;

the PD-FE(R) may be further configured to send a corresponding resource response to the SCF after receiving the resource response from the HPD-FE.

The operation that the HPD-FE performs the authorization check on the resource request may be: checking whether QoS resources related to the resource request is consistent with a local operator policy rule.

The HPD-FE may formulate the final policy rule according to one or any combination of the following elements: resource availability of the home network, service level agreement, and the initial policy rule.

The SCF may be further configured to send a resource release request to the PD-FE(R) according to a release request from the user;

the PD-FE(R) may be further configured to send the resource release request from the SCF to the HPD-FE, and send a resource release response to the SCF after receiving a resource release response from the HPD-FE;

the HPD-FE may be further configured to send the resource release request from the PD-FE(R) to the CGPE-FE, and send the resource release response to the PD-FE(R) after receiving a resource release response from the CGPE-FE;

the CGPE-FE may be further configured to release corresponding resources according to the resource release request from the HPD-FE, and send the resource release response to the HPD-FE after releasing the corresponding resources.

In the method and the system for resource and admission control of a home network according to the disclosure, it is the HPD-FE of the CPN who, according to a service request/resource modification request/service release request from a user, controls the CGPE-FE of the CPN to execute corresponding operation. Since the CGPE-FE executes corresponding operation according to the decision result of a HPD-FE, the disclosure can avoid resource control errors such as resource desynchrony or resource inconsistence and can improve system stability, even if in the case that many NGN retail service providers share a certain home gateway.

DETAILED DESCRIPTION

The basic concept of the disclosure is that: it is the HPD-FE of the customer premises network who, according to a service request/resource modification request/service release request from a user, controls the CGPE-FE of the customer premises network to execute corresponding operation.

Figure 1:
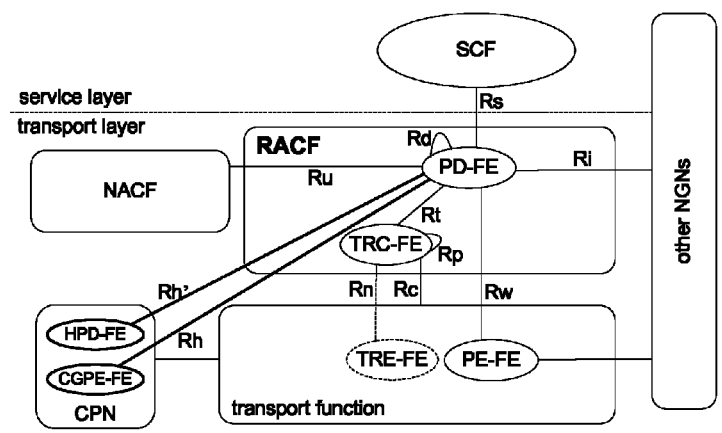
FIG. 1 shows a functional architecture diagram of the RACF of the ITU-T in the related art.
Figure 2:
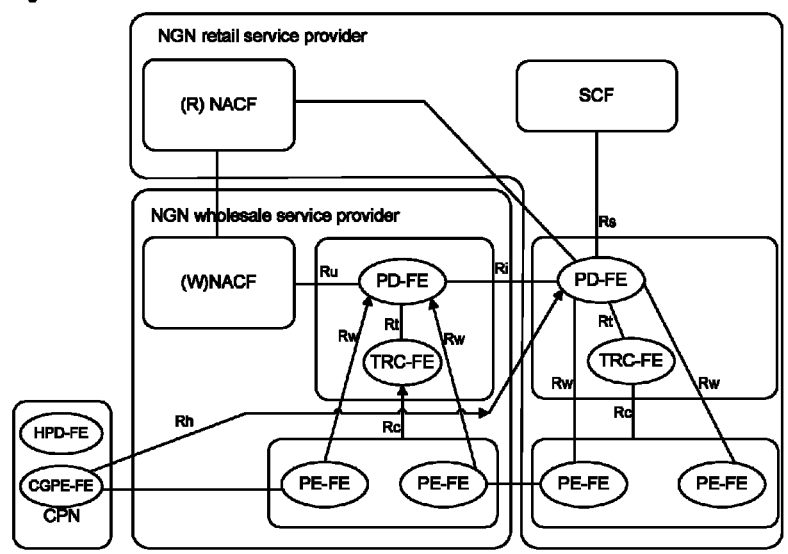
FIG. 2 shows a schematic diagram of the resource and admission control of a home network under the wholesale scene in the related art.
Figure 3:
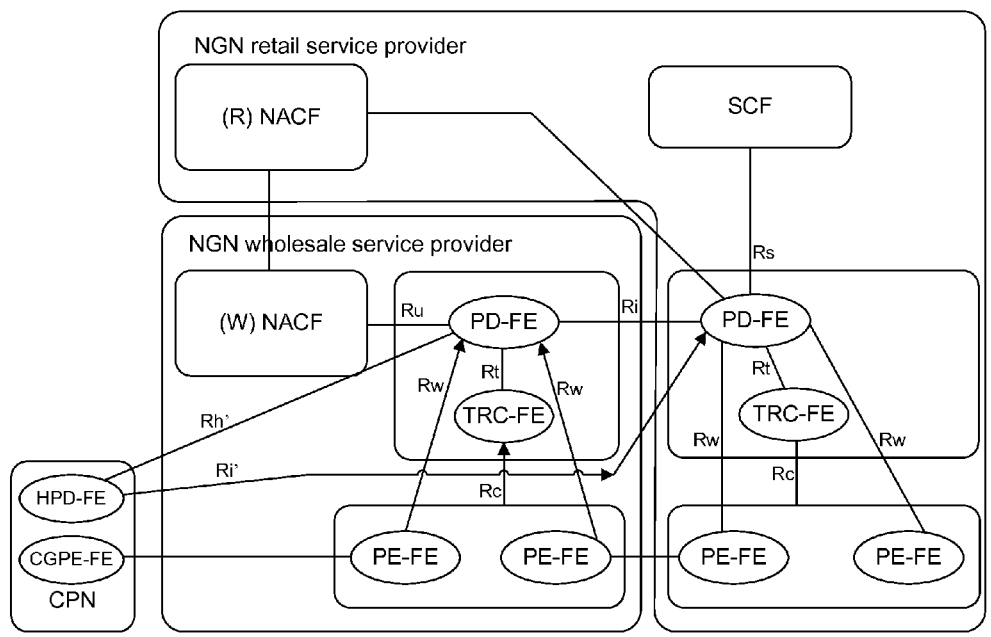
FIG. 3 shows a schematic diagram of the resource and admission control of a home network in the disclosure.

FIG. 3 shows a schematic diagram of the resource and admission control of a home network in the disclosure, as shown in FIG. 3, in the disclosure, the RACF of the NGN retail service provider does not directly control the CGPE-FE of the customer premises network, but controls the CGPE-FE through the HPD-FE of the customer premises network.

Figure 4:
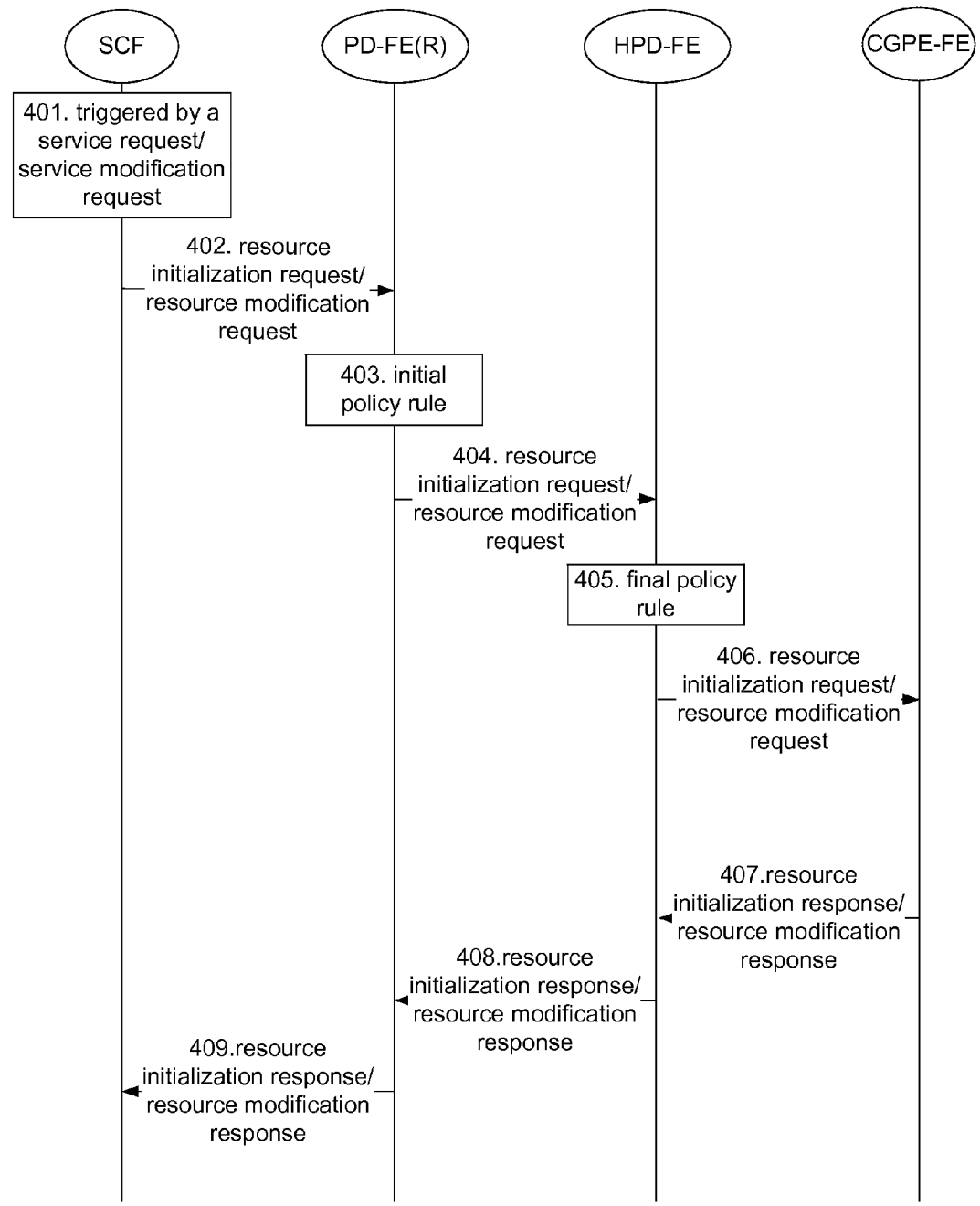
FIG. 4 shows a flow diagram of the method for resource and admission control of a home network in the disclosure.

FIG. 4 shows a flow diagram of the method for resource and admission control of a home network in the disclosure, as shown in FIG. 4, the method includes the following steps:

Step 401: a user sends a service request/service modification request to an SCF.

Step 402: the SCF, according to the service request/service modification request from the user, sends a corresponding resource initialization request/resource modification request to the PD-FE of the RACF of the NGN retail service provider (hereinafter it is called (PD-FE(R)).

Here, after receiving the service request from the user, the SCF determines the QoS parameters (such as bandwidth, service type and the like) of the requested service, and then sends the resource initialization request to the PD-FE(R) so as to request the RACF to execute QoS resource authorization and reservation for the home network, wherein the resource initialization request includes at least one of the media stream description and the QoS parameters.

After receiving the service modification request from the user, the SCF determines the media stream description and QoS parameters needing to be modified, then sends the resource modification request to the PD-FE(R), the resource modification request includes at least one of the media stream description and the QoS parameters needing to be modified.

Step 403: the PD-FE(R) performs authorization check on the received resource initialization request/resource modification request, and formulates an initial policy rule after the authorization check is passed.

After receiving the resource initialization request/resource modification request, the PD-FE(R) performs authorization check on the received resource initialization request/resource modification request according to the subscription information of the user, a local operator policy rule and the like, if the authorization check is passed, the PD-FE(R) then further formulates an initial policy rule according to the service information from the SCF, the subscription information of the user, the local operator policy rule and the like.

The initial policy rule formulated by the PD-FE(R) may include QoS resource information such as media stream description, media priority, bandwidth, service type and the like; and may further include resource control processing information such as a global IP address, reserved hold time, resource request priority, resource control session information; and may further include resource control operating information such as resource reservation mode and the like.

Step 404: the PD-FE(R) sends the resource initialization request/resource modification request to the HPD-FE.

Here, the resource initialization request/resource modification request includes at least a PD-FE(R) identifier and the initial policy rule.

Step 405: the HPD-FE performs authorization check on the resource initialization request/resource modification request, and formulates a final policy rule after the authorization check is passed.

Here, the HPD-FE may simultaneously receive resource requests including initial policy rules which are sent by one or more PD-FE(R)s.

The authorization check by the HPD-FE on the resource initialization request/resource modification request generally refers to: checking whether the QoS resources related to the resource initialization request/resource modification request is consistent with a local operator policy rule.

In addition, after the authorization check is passed, the HPD-FE generally formulates the final policy rule according to one or any combination of the following elements: resource availability of the home network, service level agreement, and initial policy rule.

Step 406: the HPD-FE sends the resource initialization request/resource modification request to the CGPF-FE, wherein the resource initialization request/resource modification request includes the final policy rule.

Step 407: the CGPE-FE executes the final policy rule sent by the HPD-FE, and sends a resource initialization response/resource modification response to the HPD-FE.

Step 408: the HPD-FE sends the resource initialization response/resource modification response to the PD-FE(R).

Step 409: the PD-FE(R) sends the resource initialization response/resource modification response to the SCF.

Figure 5:
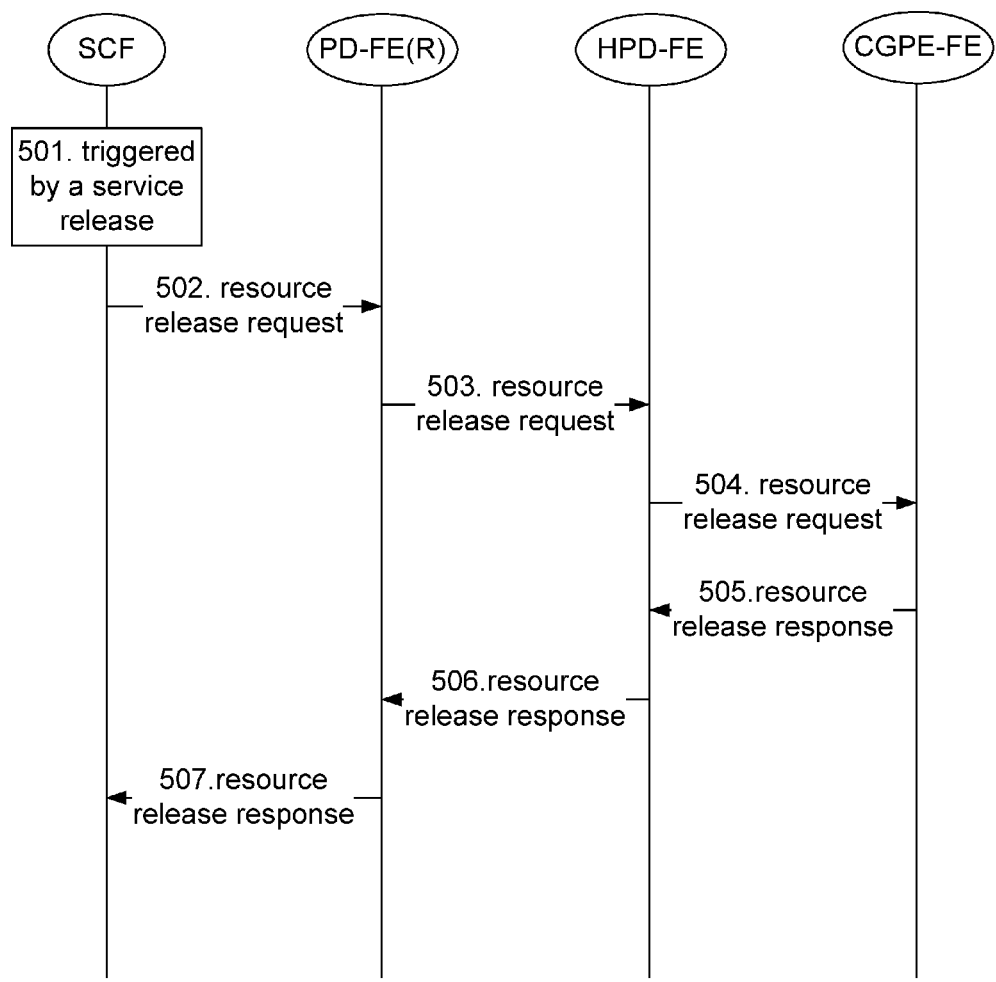
FIG. 5 shows another flow diagram of the method for resource and admission control of a home network in the disclosure.

FIG. 5 shows another flow diagram of the method for resource and admission control of a home network in the disclosure, as shown in FIG. 5, the method includes the following steps:

Step 501: a user sends a release request to an SCF to trigger the SCF to generate a resource release request.

Step 502: the SCF sends the resource release request to the PD-FE(R), wherein the resource release request includes information on QoS resources needing to be released.

Step 503: the resource release request is further sent to the HPD-FE because the PD-FE(R) does not have the home network resources needing to be released.

Step 504: the HPD-FE sends the resource release request to the CGPE-FE to unload the policy installed on the CGPE-FE and release resources.

Step 505: after releasing corresponding resources, the CGPE-FE sends a resource release response to the HPD-FE.

Step 506: the HPD-FE sends the resource release response to the PD-FE(R).

Step 507: the PD-FE(R) sends the resource release response to the SCF.

The disclosure further provide a system for resource and admission control of a home network, including: an SCF, one or more RACFs each belonging to a respective NGN retail service provider, and a CPN; wherein the SCF is configured to send a resource request to an RACF of an NGN retail service provider according to a request from a user;

the RACF of the NGN retail service provider is configured to perform authorization check on the resource request from the SCF, formulate an initial policy rule after the authorization check is passed, and send a resource request comprising the initial policy rule to the CPN;

the CPN is configured to perform authorization check on one or more resource requests after receiving them, each of which is from an RACF of a respective NGN retail service provider, formulate a final policy rule after the authorization check is passed, and execute the final policy rule.

The RACF of the NGN retail service provider includes a Policy Decision Functional Entity (PD-FE(R)), the CPN includes an HPD-FE and a CGPF-FE, wherein the PD-FE(R) is configured to perform authorization check on the received resource request, formulate an initial policy rule after the authorization check is passed, and send a resource request comprising the initial policy rule to the HPD-FE;

the HPD-FE is configured to perform authorization check on the resource request from the PD-FE(R), formulate the final policy rule after the authorization check is passed, and send a resource request including the final policy rule to the CGPF-FE;

the CGPE-FE is configured to execute the final policy rule sent by the HPD-FE according to the received resource request.

The CGPE-FE is further configured to send a corresponding resource response to the HPD-FE after executing the final policy rule;

the HPD-FE is further configured to send a corresponding resource response to the PD-FE(R) after receiving the resource response from the CGPE-FE;

the PD-FE(R) is further configured to send a corresponding resource response to the SCF after receiving the resource response from the HPD-FE.

The operation that the HPD-FE performs the authorization check on the resource request is: checking whether QoS resources related to the resource request is consistent with a local operator policy rule.

The HPD-FE formulates the final policy rule according to one or any combination of the following elements: resource availability of the home network, service level agreement, and the initial policy rule.

The SCF is further configured to send a resource release request to the PD-FE(R) according to a release request from the user;

the PD-FE(R) is further configured to send the resource release request from the SCF to the HPD-FE, and send a resource release response to the SCF after receiving a resource release response from the HPD-FE;

the HPD-FE is further configured to send the resource release request from the PD-FE(R) to the CGPE-FE, and send the resource release response to the PD-FE(R) after receiving a resource release response from the CGPE-FE;

the CGPE-FE is further configured to release corresponding resources according to the resource release request from the HPD-FE, and send the resource release response to the HPD-FE after releasing the corresponding resources.

The above are only preferred embodiments of the disclosure, which are not intended to limit the scope of protection of the disclosure.

The invention claimed is:

1. A method for resource and admission control of a home network, comprising:
   performing authorization check, by a Resource and Admission Control Function (RACF) of a Next Generation Network (NGN) retail service provider, on a resource request after receiving the resource request sent by a Service Control Function (SCF), formulating an initial policy rule after the authorization check is passed, and sending a resource request comprising the initial policy rule to a Customer Premises Network (CPN);
   performing, by the CPN, authorization check on one or more resource requests after receiving them, each of which comprises the initial policy rule and is sent by an RACF of a respective NGN retail service provider, formulating a final policy rule after the authorization check is passed, and executing the final policy rule;
   wherein sending the resource request comprising the initial policy rule by the RACF of the NGN retail service provider to the CPN, is: sending, by a Policy Decision Functional Entity of the RACF of the NGN retail service provider (PD-FE(R)), the resource request comprising the initial policy rule to a Home network Policy Decision Functional Entity (HPD-FE) of the CPN,
   performing the authorization check on the resource requests, formulating the final policy rule after the authorization check is passed, and executing the final policy rule by the CPN, is:
      performing, by the HPD-FE of the CPN, the authorization check on the resource requests, and formulating the final policy rule after the authorization check is passed;
      sending, by the HPD-FE, the resource request comprising the final policy rule to a CPN Gateway Policy Enforcement Functional Entity (CGPF-FE); and
      executing, by the CGPE-FE, the final policy rule sent by the HPD-FE according to the received resource request.

2. The method according to claim 1, further comprising:
   after the CGPE-FE executes the final policy rule,
   sending, by the CGPE-FE, a corresponding resource response to the HPD-FE;
   sending, by the HPD-FE, a corresponding resource response to the PD-FE(R); and sending, by the PD-FE(R), a corresponding resource response to the SCF.

3. The method according to claim 1, wherein the resource request is a resource initialization request or a resource modification request.

4. The method according to claim 3, wherein the resource initialization request sent by the SCF to the PD-FE(R) comprises at least one of media stream description and Quality of Service (QoS) parameters; the resource modification request comprises at least one of media stream description and QoS parameters needing to be modified.

5. The method according to claim 1, wherein the resource request sent by the PD-FE(R) to the HPD-FE comprises at least a PD-FE(R) identifier and the initial policy rule.

6. The method according to claim 1, wherein performing the authorization check by the HPD-FE on the resource request is: checking whether QoS resources related to the resource request is consistent with a local operator policy rule.

7. The method according to claim 1, wherein the HPD-FE formulates the final policy rule according to one or any combination of the following elements: resource availability of the home network, service level agreement, and the initial policy rule.

8. A method for resource and admission control of a home network, comprising:
   sending, by a Service Control Function (SCF), a resource release request to a PD-FE(R) according to a release request from a user;
   sending, by the PD-FE(R), a resource release request to a Home network Policy Decision Functional Entity (HPD-FE);
   sending, by the HPD-FE, a resource release request to a CPN Gateway Policy Enforcement Functional Entity (CGPE-FE);
   sending, by the CGPE-FE, a resource release response to the HPD-FE after releasing corresponding resources according to the resource release request from the HPD-FE;
   sending, by the HPD-FE, a resource release response to the PD-FE(R); and
   sending, by the PD-FE(R), a resource release response to the SCF.

9. The method according to claim 8, wherein the resource release request sent by the SCF to the PD-FE(R) comprises information on QoS resources needing to be released.

10. A system for resource and admission control of a home network, comprising: a Service Control Function (SCF), one or more Resource and Admission Control Functions (RACFs) each belonging to a respective NGN retail service provider, and a Customer Premises Network (CPN); wherein
   the SCF is configured to send a resource request to an RACF of an NGN retail service provider according to a request from a user;
   the RACF of the NGN retail service provider is configured to perform authorization check on the resource request from the SCF, formulate an initial policy rule after the authorization check is passed, and send a resource request comprising the initial policy rule to the CPN;
   the CPN is configured to perform authorization check on one or more resource requests after receiving them, each of which is from an RACF of a respective NGN retail service provider, formulate a final policy rule after the authorization check is passed, and execute the final policy rule;
   wherein the RACF of the NGN retail service provider comprises a Policy Decision Functional Entity (PD-FE (R)), the CPN comprises a Home network Policy Decision Functional Entity (HPD-FE) and a CPN Gateway Policy Enforcement Functional Entity (CGPF-FE), wherein
   the PD-FE(R) is configured to perform authorization check on the received resource request, formulate an initial policy rule after the authorization check is passed, and send a resource request comprising the initial policy rule to the HPD-FE;
   the HPD-FE is configured to perform authorization check on the resource request from the PD-FE(R), formulate the final policy rule after the authorization check is passed, and send a resource request including the final policy rule to the CGPF-FE;
   the CGPE-FE is configured to execute the final policy rule sent by the HPD-FE according to the received resource request.

11. The system according to claim 10, wherein
   the CGPE-FE is further configured to send a corresponding resource response to the HPD-FE after executing the final policy rule;
   the HPD-FE is further configured to send a corresponding resource response to the PD-FE(R) after receiving the resource response from the CGPE-FE;
   the PD-FE(R) is further configured to send a corresponding resource response to the SCF after receiving the resource response from the HPD-FE.

12. The system according to claim 10, wherein
   the operation that the HPD-FE performs the authorization check on the resource request is: checking whether QoS resources related to the resource request is consistent with a local operator policy rule.

13. The system according to claim 10, wherein
   the HPD-FE formulates the final policy rule according to one or any combination of the following elements: resource availability of the home network, service level agreement, and the initial policy rule.

14. The system according to claim 10, wherein
   the SCF is further configured to send a resource release request to the PD-FE(R) according to a release request from the user;
   the PD-FE(R) is further configured to send the resource release request from the SCF to the HPD-FE, and send a resource release response to the SCF after receiving a resource release response from the HPD-FE;
   the HPD-FE is further configured to send the resource release request from the PD-FE(R) to the CGPE-FE, and send the resource release response to the PD-FE(R) after receiving a resource release response from the CGPE-FE;
   the CGPE-FE is further configured to release corresponding resources according to the resource release request from the HPD-FE, and send the resource release response to the HPD-FE after releasing the corresponding resources.

15. The method according to claim 2, wherein the resource request is a resource initialization request or a resource modification request.

16. The method according to claim 15, wherein the resource initialization request sent by the SCF to the PD-FE (R) comprises at least one of media stream description and Quality of Service (QoS) parameters; the resource modification request comprises at least one of media stream description and QoS parameters needing to be modified.

* * * * *